June 10, 1969 M. C. MENSOR, JR 3,448,521

DENTAL CONSTRUCTION

Filed Oct. 22, 1965

INVENTOR
MERRILL C. MENSOR, JR.
BY *Naylor & Neal*
ATTORNEY

United States Patent Office 3,448,521
Patented June 10, 1969

3,448,521
DENTAL CONSTRUCTION
Merrill C. Mensor, Jr., San Mateo, Calif. (1469 Bellview Ave., #406, Burlingame, Calif. 94010)
Filed Oct. 22, 1965, Ser. No. 502,020
Int. Cl. A61c 13/22
U.S. Cl. 32—5     4 Claims

ABSTRACT OF THE DISCLOSURE

A hinge joint for mounting a dental prosthesis to an anchor tooth. The joint is of the type comprised of normally movably interconnected first and second members adapted to be fixed, respectively, to the anchor tooth and prosthesis to provide for limited relative translation therebetween. It is uniquely characterized in that it incorporates selectively interengageable locking elements on the respective members to provide for locking of the prosthesis relative to the anchor tooth at a fixed reference point.

---

The present invention relates to an improved resilient hinge joint for anchorage of dental prostheses, such as partial dentures and bridges.

In the prior art, various hinge joints for the anchorage of partial dentures and bridges have been used. One type which has been particularly successful is a resilient hinge joint of the type shown in the Swiss Patent 308,122. Despite its success the resilient hinge joint has several undesirable characteristics. One of the most serious is the amount of time required in positioning the resilient hinge joint in the preparation of a partial denture or a bridge. Another difficulty with this type of resilient hinge joint is that it is difficult to make accurate impressions for replacement of identical attachments. This results because the partial denture or bridge is normally free to move when mounted by the resilient hinge and movement occurs when an attempt is made to make an impression of the attachment. Such movement is extremely difficult to prevent with the prior art resilient hinge joints.

It is, therefore, a principal object of this invention to provide an improved resilient hinge joint which may be positioned to provide the proper orientation with respect to the attachment with a minimum of time and effort.

Another object of this invention is to facilitate accurate taking of impressions for replacement of identical attachments.

Yet another object of the invention is to provide a resilient hinge joint which may be selectively locked against resilient hinge action to facilitate the use thereof in mounting dental bridges.

Figure 1:
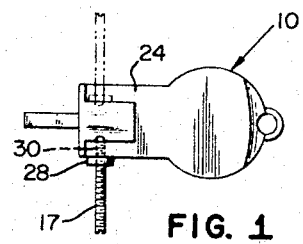
Figure 2:
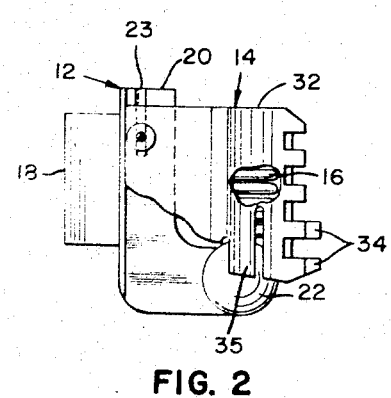
Figure 3:
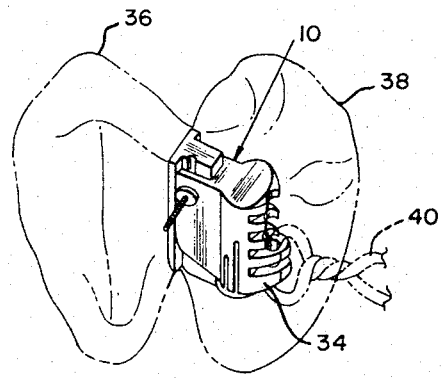
Figure 4:
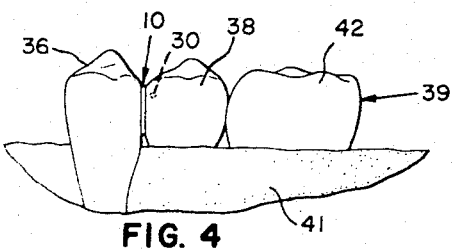
Figure 5:
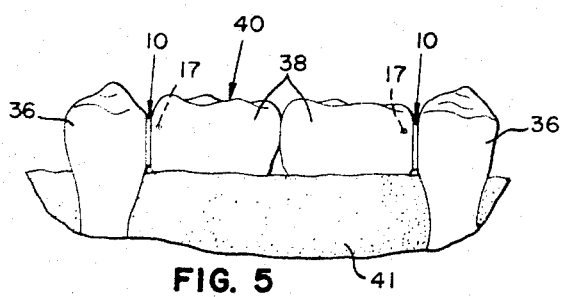

The detailed structure and operation of the invention and the foregoing and other objects will be more apparent when viewed in the light of the accompanying drawings, wherein:

FIG. 1 is a plan view illustrating an embodiment of the inventive device;
FIG. 2 is an elevation view illustrating the embodiment of the inventive device shown in FIG. 1;
FIG. 3 is a perspective view illustrating the inventive device in its mounted position;
FIG. 4 is an elevation view illustrating the inventive device as it would appear with a partial denture; and
FIG. 5 is an elevation view illustrating the inventive device as it would appear with a bridge.

Referring now to FIGS. 1 and 2, the embodiment of the improved resilient hinge joint is designated in its entirety by the numeral 10. The joint 10 comprises a male member 12, a female member 14, a spring 16, and a set screw 17. The male member 12 comprises a mounting flange 18, a T-shaped beam 20 fixed to the flange 18 and having a groove 23 therein, and a ball-shaped appendage 22 fixed to the beam 20. The female member 14 comprises a guiding channel 24 adapted to be slidably received over the beam 20 and having a reinforcing disk 28 fixed to one leg thereof and a cylinder 32 fixed to the base thereof. A threaded aperture 30 extends through the disk 28 and the leg of the channel 24 fixed thereto and threadably receives the screw 17. When the male and female members are in the assembled condition illustrated in FIGS. 1 and 2, the screw 17 is in alignment with the groove 23. Thus, through turning thereof in the threaded aperture 30, the screw 17 may be selectively engaged and disengaged from the groove 23. Engagement of the screw 17 in the groove 23 functions to restrict relative rectilinear and/or rotational movement between the male and female members 10 and 12, respectively. Whether solely rectilinear, or both rectilinear and rotational, movement is restricted depends on the degree to which the screw 17 is tightened into the groove 23. Phantom lines in FIG. 1 show that the screw and groove arrangement may be provided on either, or both, sides of the joint.

The structure of the cylinder 32 is completed by loops 34 fixed to and extending from the side thereof opposed to the guiding channel 24 and lamellae, 35, formed integrally with the lower end thereof. The lamellae, 35, as will become apparent from the following description, function to grip the ball-shaped appendage 22 when the male and female members 12 and 14, respectively, are assembled. The latter relationship functions to normally resist separation of the male and female members while permitting articulation therebetween.

The foredescribed hinge joint construction differs from that disclosed in Swiss Patent 308,112 primarily in the provision of groove 23 in the beam 20 and cooperating disk 28, aperture 30 and set screw 17 on the channel 24. Thus, the hinge joint construction of the present invention has all of the operational characteristics of that disclosed in the Swiss patent, plus the ability to be selectively restricted against relative rectilinear and/or rotational movement between its male and female members.

FIG. 3 illustrates the improved resilient hinge joint 10 mounted between an anchor tooth 36 and inside of a housing tooth 38. Wire, 40, is fastened to the loops 34 to provide better retention of the housing tooth 38.

In FIG. 4, the improved resilient hinge joint 10 is shown as it would appear when mounted between an anchor tooth 36 and a partial denture or prosthesis 39 comprised of a housing tooth 38 and an appending artificial tooth 42 fixed thereto as by wire 40 (see FIG. 3). The partial denture 39 is shown riding on the gum tissue 41.

Referring now to FIG. 5, therein is illustrated a pair of the improved resilient hinge joints 10 as they would appear when used with a bridge 40. In this figure, the bridge 40 is shown as being comprised of a pair of housing teeth 38 fixedly secured together and mounted between anchor teeth 36 by hinge joints 10. When the hinge joints 10 are used with a bridge 40 the set screws 17 thereof are generally in a secured position. Thus, the bridge 40 is locked against rectilinear movement. However, if rectilinear movement is desired the set screws 17 may be loosened. In the event that the bridge is used with the set screws 17 in the secured position, which would be the usual condition, springs 16 may be omitted from the hinge structure. Omission of the springs 16 is so permitted because the male and female members 12 and 14, respectively, of the hinge joints are locked against relative movement when the set screws 17 are in the secured position.

The operation of the hinge joint of the present invention, as contrasted to the disclosed in Swiss Patent 308,122, will now be described. When the set screw 17 is withdrawn from the groove 23 the male and female members of the present invention are free for relative rotational and rectilinear movement in a manner corresponding to that of the Swiss patent device. In this condition, when the hinge joint is secured between anchor and housing teeth (as illustrated in FIGS. 3 and 4) it allows for restricted vertical translation of the housing tooth which is cushioned by the relatively hard coil spring 16. As this vertical movement is arrested by the spring 16, it is converted to hinge movement about the appendage 22. Thus, a limited pressure is applied to the gum tissue 41, giving it a physiological normal stimulation which greatly reduces or eliminates one of the major causes of pressure atrophy of the gum ridge.

In the foregoing application, the female member 14 may be locked in any desired vertical position by tightening the set screw 17 into secured position within the groove 23. This provides for the quick and convenient positioning of the resilient hinge in the preparation of partial denture or bridge. This is in striking contrast to the method used to position prior resilient hinge joints used in the dental art, such as that of Swiss Patent 308,122. The latter method generally consists of inserting a plaster plug between the gum tissue and the cylinder of the joint. While this does prevent movement of the hinge joint, the method requires considerable time to affect the proper orientation of the joint. In weighing this contrast, it can be seen that the present invention provides an improved technique by which proper positioning can be affected with a minimum expenditure of time and effort. This is especially advantageous for affecting clinical (in the mouth) adjustments.

In the application of the inventive device, the set screw 17 may also be partially withdrawn from the groove 23 so that rotational movement of the female member 13 is prevented with respect to the male member 12, but rectilinear action is still permitted. Thus, the joint may be quickly converted from one having both rotational and rectilinear movement into one which has only rectilinear movement.

At this point it is noted that in normal use of the present invention with a partial denture, as illustrated in FIG. 4, the hinge restriction is only used when fitting or adjusting the denture. However, in normal use of the invention with a bridge, as illustrated in FIG. 5, the hinge restriction is used when the bridge is in operative condition within the user's mouth, as well as when it is being fitted and adjusted. When in the operative condition with a bridge, it has been found preferable to completely lock the hinge structure against both rotational and rectilinear movement. Use of the present invention with a bridge has the special advantage that in the event one anchor tooth is lost, the bridge may be converted to a partial denture, such as shown in FIG. 4, without disturbing the remaining anchor tooth. To affect such a conversion, it is merely necessary to fabricate a partial denture to be mounted on the original male member of the remaining anchor tooth.

To conclude, from the foregoing description it is believed apparent that the present invention enables accomplishment of the objects initially set forth herein. It is to be understood, however, that the invention is not intended to be limited to the specific embodiment illustrated and described, but rather is defined by the following claims.

What is claimed is:
1. In a hinge joint for the anchorage of dental prostheses, comprising:
   (a) a beam adapted to be fixedly secured to an anchor tooth;
   (b) a guiding appendage attached to and extending laterally from said beam;
   (c) a tubular guide slidably received over said appendage for rectilinear and rotational movement relative thereto, said guide being adapted to be fixedly secured to a dental prosthesis; and
   (d) a channel fixed to said guide and slidably received on said beam in guiding relationship thereto, the improvement comprising:
      (1) a retention surface on said beam;
      (2) a threaded aperture in the channel; and
      (3) a setscrew threadably engaged with the aperture and adapted to be screwed into and out of locking engagement with the retention surface on said beam to selectively prevent or permit, respectively, rotational movement of the guide relative to the beam.

2. A device according to claim 1, wherein said retention surface is a groove in said beam.

3. In a hinge joint for the anchorage of dental prostheses, comprising:
   (a) a beam adapted to be fixedly secured to an anchor tooth;
   (b) a guiding appendage attached to and extending laterally from said beam;
   (c) a tubular guide slidably received over said appendage for rectilinear and rotational movement relative thereto, said guide being adapted to be fixedly secured to a dental prosthesis; and
   (d) a channel fixed to said guide and slidably received on said beam in guiding relationship thereto, the improvement comprising:
      (1) a retention surface on said beam;
      (2) a threaded aperture in the channel; and
      (3) a setscrew threadably engaged with the aperture and adapted to be screwed into and out of locking engagement with the retention surface on said beam to selectively and simultaneously prevent or permit, respectively, rectilinear and rotational movement of the guide relative to the beam.

4. A device according to claim 3 wherein said retention surface is a groove in said beam.

References Cited

UNITED STATES PATENTS

| | | | |
|---|---|---|---|
| 1,480,549 | 1/1924 | Emerson | 32—5 |
| 2,127,285 | 8/1938 | Brecht | 32—5 |
| 2,748,480 | 6/1956 | Weissman | 32—5 |

FOREIGN PATENTS

| | | |
|---|---|---|
| 1,359,823 | 3/1964 | France. |
| 540,628 | 3/1956 | Italy. |
| 308,122 | 6/1955 | Switzerland. |
| 523,570 | 4/1955 | Italy. |

ROBERT PESHOCK, *Primary Examiner.*